United States Patent Office 3,632,835
Patented Jan. 4, 1972

3,632,835
HYDROCARBON ISOMERIZATION PROCESS
Roy T. Mitsche, McHenry, and Ernest L. Pollitzer, Skokie, Ill., assignors to Universal Oil Products Company, Des Plaines, Ill.
No Drawing. Continuation-in-part of application Ser. No. 723,896, Apr. 24, 1968. This application Feb. 25, 1969, Ser. No. 802,206
Int. Cl. C07c 5/22
U.S. Cl. 260—666    14 Claims

ABSTRACT OF THE DISCLOSURE

Isomerizable hydrocarbons including paraffins, cycloparaffins, olefins, and alkylaromatics, are isomerized by contacting the hydrocarbon, at isomerization conditions, with a catalytic composite containing a platinum group component and a rhenium component combined with a carrier material containing alumina and a finely-divided crystalline aluminosilicate.

CROSS-REFERENCES TO RELATED APPLICATIONS

This application is a continuation-in-part of our copending application, Ser. No. 723,896, filed Apr. 24, 1968, now U.S. Pat. 3,523,914, the teachings of which are specifically incorporated herein.

BACKGROUND OF THE INVENTION

This invention relates to a process for isomerizing isomerizable hydrocarbons, particularly isomerizable paraffins, cycloparaffins, olefins, and alkylaromatic. More particularly, this invention relates to a process for isomerizing isomerizable hydrocarbons with a cathlytic-composite comprising platinum group metallic component and a rhenuim component combined with a carrier material containing alumina and a finely-divided crystalline aluminosilicate.

Isomerization processes for the isomerization of hydrocarbons have acquired significant importance within the petrochemical and petroleum refining industry. The demand for the xylene isomers, particularly para-xylene, has resulted in the need for processes for isomerizing xylenes and ethylbenzene to obtain a desired xylene isomer such as para-xylene or ortho-xylene. Also, the need for branched paraffins such as isobutane or isopentane, as intermediates for the production of high octane motor fuel alkylate, can be met by isomerizing the corresponding n-paraffins. In addition, in motor fuel produced by alkylation, it is desired that the final alkylate be highly branched. This can be accomplished by alkylating isobutane or isopentane with a $C_4$-$C_7$ internal olefin which, in turn, can be produced by the isomerization of a linear alpha-olefin by shifting the double bond to a more central position.

SUMMARY OF THE INVENTION

Accordingly, it is an object of this invention to provide a process for isomerizing isomerizable hydrocarbons. More specifically, it is an object of this invention to provide an isomerization process using a particular isomerization catalyst effective in isomerizing isomerizable hydrocarbons without introducing undesired decomposition reactions.

In a broad embodiment, this invention relates to a process for isomerizing an isomerizable hydrocarbon which comprises contacting said hydrocarbon at isomerization conditions with a catalytic composite comprising a platinum group metallic component and a rhenium component combined with a carrier material containing alumina and a finely-divided crystalline aluminosilicate.

In a more specific embodiment, this invention relates to the isomerization of a saturated or olefinic isomerizable hydrocarbon by contacting the hydrocarbon with the aforementioned cvatalytic composite at isomerization conditions which include a temperature of about 0° C. to about 425° C., a pressure of about atmospheric to about 200 atmospheres, and a liquid hourly space velocity of about 0.1 to about 10 hr.$^{-1}$. In another limited embodiment, this process relates to the isomerization of an isomerizable alkylaromatic hydrocarbon by contacting the alkylaromatic with the aforementioned catalytic composite at isomerization conditions which include a temperature of about 200° C. to about 600° C., a pressure of about atmospheric to about 100 atmospheres, a liquid hourly space velocity of about 0.1 to about 20.0 hr.$^{-1}$, and a hydrogen to hydrocarbon mole ratio of about .5:1 to about 20:1.

In a more specific embodiment, the catalytic composite used in isomerizing the foregoing isomerizable hydrocarbons has mordenite as the crystalline aluminosilicate in about 0.5 to about 20.0 wt. percent of the carrier material, the platinum group metallic component is about 0.02 to about 1.0 wet. percent of said catalyst and said rhenium component is about 0.02 to about 1.0 wt. percent of said catalyst.

Other objects and embodiments referring to alternative isomerizable hydrocarbons and to alternative catalytic compositions will be found in the following further detailed description of the invention.

DESCRIPTION OF PREFERRED EMBODIMENTS

The process of this invention is applicable to the isomerization of isomerizable saturated hydrocarbons including acyclic paraffins and cyclic naphthenes and is particularly suitable for the isomerization of straight chain or mildly branched chain paraffins containing 4 or other carbon atoms per molecule such as normal butane, normal pentane, normal hexane, normal heptane, normal octane, etc., and mixtures thereof. Cycloparaffins applicable are those ordinarily containing at least 5 carbon atoms in the ring such as alkylcyclopentanes and cyclohexanes, including methylcyclopentane, dimethylcyclopentane, cyclohexane, methylcyclohexane, dimethylcylcohexane, etc. This process also applies to the conversion of mixtures of paraffins and/or naphthenes such as those derived by selective fractionation and distillation of straight-run natural gasolines and naphthas. Such mixtures of paraffins and/or naphthenes include the so-called pentane fractions, normal hexane fractions, and mixtures thereof. It is not intended to limit this invention to these enumerated saturated hydrocarbons, and it is contemplated that straight or branched chain saturated hydrocarbons containing up to about 20 carbon atoms per molecule may be isomerized according to the process of the present invention. Particularly preferred are the $C_4$-$C_9$ paraffins.

The olefins applicable within this isomerization process are generally a mixture of olefinic hydrocarbons of approximately the same molecular weight, including the 1-isomer, 2-isomer, and other position isomers, capable of undergoing isomerization to an olefin in which the double bond occupies a more centrally located position in the hydrocarbon chain. The process of this invention can be used to provide an olefinic feedstock, for motor fuel alkylation purposes, containing an optimum amount of the more centrally located double bond isomers, by converting the 1-isomer, or other near terminal position isomer, into olefins wherein the double bond is more centrally located in the carbon atom chain.

The process of this invention is also applicable to the isomerization of such isomerizable olefinic hydrocarbons such as the isomerization of 1-butene to 2-butene, or the isomerization of the 3-methyl-1-butene to 2-methyl-2-butene. Also, the process of this invention can be utilized to shift the double bond of an olefinic hydrocarbon such as 1-pentene, 1-hexene, 2-hexene, and 4-methyl-1-pentene to a more centrally located position so that 2-pentene, 2-hexene, 3-hexene and 4-methyl-2-pentene, respectively, can be obtained. It is not intended to limit this invention to these enumerated olefinic hydrocarbons as it is contemplated that shifting of the double bond to a more centrally located position may be effective in straight or branched chain olefinic hydrocarbons containing up to about 20 carbon atoms per molecule. The process of this invention also includes the hydroisomerization of these olefins, wherein these olefins are hydrogenated and isomerized to branched paraffins.

Further, the process of this invention is also applicable to the isomerization of isomerizable alkylaromatic hydrocarbons including ortho-xylene, meta-xylene, paraxylene, ethylbenzene, the ethyltoluenes, the trimethylbenzenes, the diethylbenzenes, the triethylbenzenes, normal propyl-benzene, isopropylbenzene, etc., and mixtures thereof. Preferred isomerizable alkylaromatic hydrocarbons are the monocyclic alkylaromatic hydrocarbons, that is, the alkyl benzene hydrocarbons, particularly the $C_8$ alkyl-benzenes and non-equilibrium mixtures of the various $C_8$ aromatic isomers. Higher molecular weight alkyl-aromatic hydrocarbons are also suitable. These include aromatic hydrocarbons produced by the alkylation of benzene with $C_9$–$C_{18}$ olefin polymers or linear $C_9$–$C_{18}$ olefin-acting compounds and used as intermediates in the preparation of sulfonated surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. Other suitable alkylaromatic hydrocarbons include those alkylaromatic hydrocarbons with two or more aryl group such as the alkyl-substituted diphenyls such as diphenyl methane, the alkyl-substituted tri-phenyls such as triphenyl methane, the alkyl-substituted fluorenes, the alkyl-substituted stilbenes, etc. Also included are those alkyl-aromatics containing condensed aromatic rings such as the alkylnaphthalenes, the alkylanthracenes, the alkyl-phenanthrenes, etc.; however, in using these high-molecular weight alkylaromatics, it is important that these compounds exist in the liquid phase at isomerization conditions to avoid excessive cracking of these high molecular weight compounds.

These foregoing isomerizable hydrocarbons may be derived as selective fractions from various naturally-occurring petroleum streams either as individual components or, as certain boiling range fractions obtained by the selective fractionation and distillation of catalytically cracked gas oil. Thus, the process of this invention may be successfully applied to and utilized for complete conversion of isomerizable hydrocarbons when these isomerizable hydrocarbons are present in minor quantities in various fluid or gaseous streams. Thus, the isomerizable hydrocarbons for use in the process of this invention need not be concentrated. For example, isomerizable hydrocarbons appear in minor quantities in various refinery streams, usually diluted with gases such as hydrogen, nitrogen, methane, ethane, propane, etc. These refinery streams containing minor quantities of isomerizable hydrocarbons are obtained in petroleum refineries and various refinery installations including thermal cracking units, catalytic cracking units, thermal reforming units, coking units, polymerization units, dehydrogenation units, etc. Such refinery offstreams have in the past often been burned for fuel value, since an economical process for the utilization of the hydrocarbon content has not been available. This is particularly true for refinery fluid streams known as off gas streams containing minor quantities of isomerizable hydrocarbons.

The catalyst to be used in isomerizing the foregoing isomerizable hydrocarbons comprises a carrier material containing alumina and a crystalline aluminosilicate having combined therewith a platinum group component and a rhenium component. In addition, in some cases, the composite may contain a halogen and/or a sulfur component. It is preferred that the alumina utilized in this catalyst be a porous, adsorptive, high-surface area material having a surface area of about 25 to about 500 or more square meters per gram. Suitable alumina materials are the crystalline aluminas known as gamma-, eta- and theta-alumina, with gamma-alumina giving the best results. In addition, in some embodiments, the carrier material may contain minor proportions of other well known refractory inorganic oxides such as silica, zirconia, magnesia, etc. However, the preferred carrier material comprises substantially pure gamma alumina containing a minor proportion of a finely-divided aluminosilicate.

It is an essential feature of the catalyst used in this process that the carrier material contains a finely divided crystalline aluminosilicate. As is well known to those skilled in the art, crystalline alminosilicates (also known as "zeolites" and "molecular sieves") are composed of a three-dimensional interconnecting network structure of silica and alumina tetrahedra. The tetrahedra are formed by four oxygen atoms surrounding a silicon or aluminum atom, and the basic linkage between the tetrahedra is through the oxygen atoms. These tetrahedra are arranged in an ordered structure to form interconnecting cavities or channels of uniform size interconnected by uniform openings or pores. The ion-exchange property of these materials follows from the trivalent nature of aluminum which causes the alumina tetrahedra to be negatively charged and allows the association with them of cations in order to maintain electrical balance in the structure. The molecular sieve property of these materials flows from the uniform size of the pores thereof which can be correlated to the size of the molecules that are present in a mixture of molecules and used to separate molecules having a critical diameter less than or equal to the pore mouths of these crystalline aluminosilicates. It is preferred to use crystalline aluminosilicates having pore mouths of at least 5 angstroms in cross-sectional diameter, and more preferably about 5 to about 15 angstrom units. Ordinarily, the aluminosilicates are synthetically prepared in the alkali metal form with one alkali metal cation associated with each aluminum centered tetrahedra. This alkali metal cation may be thereafter ion-exchanged with polyvalent cations such as calcium, magnesium, beryllium, rare earth cations, etc. Another treatment of these alkali metal aluminosilicates involves ion-exchange with ammonium ions followed by thermal treatment, preferably at about 300° F. to convert them to the hydrogen form. When the crystalline aluminosilicates contain a high mole ratio of silica to alumina (for example, above 5), the material may be directly converted to an acid form in a suitable acid medium.

Although in some cases the polyvalent form of the aluminosilicate may be used in the present invention, it is preferred to use the hydrogen form, or a form, for example, the alkali metal form, which is convertable to the hydrogen form during the course of the preferred procedure for incorporation of the crystalline aluminosilicates in the carrier material (explained below).

The preferred crystalline aluminosilicates are the hydrogen and/or polyvalent forms of synthetically prepared faujasite and mordenite. In fact, we have found best results with synthetic mordenite having an effective diameter of about 6 angstrom units and a mole ratio of silica to alumina of about 9 to 10, and more particularly, the hydrogen form of mordenite.

A particularly preferred crystalline aluminosilicate is acid-extracted mordenite having an $SiO_2/Al_2O_3$ ratio substantially above 10. One method of forming this material involves subjecting the ordinary form of mordenite having a $SiO_2/Al_2O_3$ of about 9 to 10 to the action of a strong acid such as hydrochloric acid, sulfuric acid, hydrofluoric acid, etc., at conditions effecting the removal or extraction of at least a portion of the aluminum from the mordenite. Typically this procedure can be used to obtain mordenite having a $SiO_2/Al_2O_3$ ratio of about 11 or more.

Regarding the method of incorporating the crystalline aluminosilicate into the carrier material, we have found that best results were obtained by adding the CAS directly into an aluminum hydroxyl chloride sol prior to its formation in the alumina carrier material. An advantage of this method is the relative ease with which the CAS can be uniformly distributed in the resulting carrier material. Additionally, the sol appears to react with the CAS causing some basic modification of the structure of the resulting material which enables it to have unusual ability to catalyze reactions which depend on carbonium ion intermediates such as cracking, alkylation, isomerization, polymerization, etc.

Accordingly, the preferred method for preparing the carrier material involves the following steps: forming an aluminum hydroxyl chloride sol by digesting aluminum in HCl to result in a sol having a weight ratio of aluminum to chloride of about 1.0 to about 1.4; evenly distributing the CAS throughout the sol; gelling the resultant mixture to produce a hydrogel or particles of a hydrogel; then finishing the hydrogel into the carrier material by standard aging, washing, drying and calcination steps. See U.S. Pat. No. 2,620,314 for details as to one preferred method of forming the resultant mixture into spherical particles.

The amount of CAS in the resulting carrier material is preferably about 0.5 to about 20 wt. percent and, more particularly, about 1.0 to about 10.0 wt. percent. By the expression "finely divided" it is meant that the CAS is used in a particle size having an average diameter of about 1 to about 100 microns, with best results obtained with particles of average diameter of less than 40 microns.

Although not essential, it is preferred that the catalyst also contain a halogen component. Although the precise form of the chemistry of the association of the halogen component with the carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and chlorine are preferred for the purposes of the present invention. The halogen may be added to the carrier material in any suitable manner, either during preparation thereof or before or after the addition of the catalytically active metallic components. For example, the halogen may be added, at any stage of the preparation of the carrier material or to the calcined carrier material, as an aqueous solution of an acid such as hydrogen fluoride, hydrogen chloride, hydrogen bromide, etc. The halogen component, or a portion thereof, may be composited with the carrier material during the impregnation of the latter with the platinum group component; for example, through the utilization of a mixture of chloroplatinic acid and hydrogen chloride. In another situation, the aluminum hydroxyl-chloride hydrosol, which is preferably utilized to form the carrier material, contains halogen and thus can contribute some portion of the halogen component to the final composite. In any event, the halogen is preferably composited with the carrier material in such a manner as to result in a final composite that contains about 0.1% to about 1.5% and more preferably about 0.4 to about 0.9% by weight of halogen calculated on an elemental basis.

It is essential that the catalyst contain a platinum group metallic component. Although the process of the present invention is specifically directed to the use of a catalytic composite containing platinum or palladium, it is intended to include other platinum group metals such as rhodium. The platinum group metallic component, such as platinum or palladium may exist within the final catalytic composite as a compound such as an oxide, sulfide, halide, etc., or as an elemental state. Generally, the amount of the platinum group metallic component present in the final catalyst is small compared to the quantities of the other components combined therewith. In fact, the platinum group metallic component generally comprises about 0.02 to about 1.0% by weight of the final catalytic composite calculated on an elemental basis. Excellent results are obtained when the catalyst contains about 0.3 to about 0.9 weight percent of the platinum group metal.

The platinum group metallic component may be incorporated in the catalytic composite in any suitable manner such as coprecipitation or cogellation with the alumina carrier material, ion-exchange with the alumina hydrogel, or impregnation either after or before calcination of the alumina hydrogel, etc. The preferred method of incorporating this component involves the utilization of water soluble compounds of the platinum group metals with which the carrier material is combined by an impregnation technique. Thus, the platinum group metal may be added to the carrier material by commingling the latter with an aqueous solution of chloroplatinic acid. Other water-soluble compounds of platinum may be employed as impregnation solutions and include ammonium chloroplatinate, platinum chloride, dinitro diamino platinum, etc. The utilization of a platinum chloride compound, such as chloroplatinic acid, is preferred since it facilitates the incorporation of both the platinum component and at least a minor quantity of the preferred halogen component in a single step. Hydrogen chloride is also generally added to the impregnation solution in order to further facilitate the incorporation of the halogen component. In addition, it is generally preferred to impregnate the carrier material after it has been calcined in order to minimize the risk of washing away the valuable platinum metal compounds; however, in some cases, it may be advantageous to impregnate the support when it is in a gelled state. Following the impregnation, the resulting impregnated support is dried and subjected to a high temperature calcination or oxidation technique at a temperature of 850° F. to about 1100° F.

Another essential constituent of the catalyst is the rhenium component. This component may be present as an elemental metal, as a chemical compound, such as the oxide, sulfide, halide, or in a physical or chemical association with the alumina carrier material and/or the other components of the catalyst. Generally, the rhenium component is utilized in an amount sufficient to result in a final catalytic composite containing about 0.02 to about 1.0 wt. percent rhenium calculated as an elemental metal. The rhenium component may be incorporated in the catalytic composite in any suitable manner and at any stage in the preparation of the catalyst. As a general rule, it is advisable to introduce the rhenium at a later step of the preparation in order that the expensive metal will not be lost due to subsequent processing involving washing and purification treatments. The preferred procedure for incorporating the rhenium component involves the impregnation of the carrier material either before, during, or after the other components referred to above are added. The impregnation solution can, in some cases, be an aqueous solution of a suitable rhenium salt such as ammonium perrhenate, sodium perrhenate, potassium perrhenate and the like salts. In addition, aqueous solutions of rhenium halides such as the chlorides may be used if desired; however, the preferred impregnation solution is an aqueous solution of perrhenic acid. In general, the rhenium component can be impregnated either prior to, simultaneously with, or after the platinum group metallic component is added to the carrier material. However, we have found that best results are achieved when the rhenium component is impregnated simultaneously with the platinum group metallic component. In fact, we have determined that an especially preferred impregnation solution contains chloroplatinic acid, hydrogen chloride and perrhenic acid.

In addition, we have determined that an especially preferred catalytic composite is prepared when the weight ratio, calculated on an elemental basis, of the rhenium component to the platinum group metallic component is selected from the range of about 0.05:1 to about 2.75:1. This is particularly true when the total weight content of the rhenium component plus the platinum group metallic component in the catalytic composite is fixed in the range of about .2 to about 1.4 wt. percent and more preferably about .4 to about 1.0, calculated on an elemental basis. Accordingly, examples of especially preferred catalytic composites are composites containing .1 wt. percent Re+.65 wt. percent Pt, 2 wt. percent Re+.55 wt. percent Pt, .375 wt. percent Re+.375 wt. percent Pt, 0.55 wt. percent Re+0.20 wt. percent Pt, and 0.65 wt. percent Re+0.10 wt. percent Pt. The exact combination of components are often a function of the feedstock. For example, when processing stocks containing greater than 1 p.p.m. sulfur, a mole ratio of platinum to rhenium greater than unity is preferred. While the foregoing discussion has been directed to platinum and platinum compounds, palladium and the corresponding palladium compounds are likewise equally applicable.

Another constituent of the catalyst of the present invention may be a technetium component either in place of or in conjunction with rhenium. This component may be present as an elemental metal, as a chemical compound, such as the oxide, sulfide, halide, or in a physical or chemical association with the alumina support and/or the other components of the catalyst. Generally, the technetium component is utilized in an amount sufficient to result in a final catalytic composite containing about 0.01 to about 1.0 wt. percent technetium calculated as elemental metal. The technetium component may be incorporated in the catalytic composite in any suitable manner and at any stage in the preparation of the catalyst. As a general rule, it is advisable to introduce the technetium at a later step of the preparation in order that the expensive metal will not be lost due to subsequent processing involving washing and purification treatments. The preferred procedure for incorporating the technetium components involves the impregnation of the alumina carrier material either before, during, or after the other components referred to above are added. The impregnation solution can in some cases be an aqueous solution of a suitable acidic technetium salt such as an aqueous solution of a technetium halide such as the chloride; however, the preferred impregnation solution is an aqueous solution of pertechnic acid ($HTcO_4$). In general, the technetium component can be impregnated either prior to, simultaneously with, or after the platinum group metallic component is added to the support. However, best results are achieved when the technetium component is impregnated simultaneously with the platinum group metallic component. In fact, a preferred impregnation solution contains chloroplatinic acid, hydrogen chloride, and pertechnic acid.

As is well known to those skilled in the art, technetium is an artificially prepared element that apparently does not exist in nature. Recently, it has become available in commercial quantities from the Atomic Energy Commission because it is one of the by-products formed during the operation of a nuclear fission reactor. The isotope of technetium which is preferred for use in the present invention is the one with an atomic weight of 99; it is radioactive and is reported to possess a half-life of about $4.7 \times 10^{+5}$ years. Naturally, suitable safeguards designed to protect against radioactivity must be used both during the preparation of the catalyst of the present invention and the use thereof in the conversion of hydrocarbons.

Regardless of the details of how the components of the catalyst are composited with the alumina carrier material, the final catalyst generally will be dried at a temperature of from about 200° F. to about 600° F. for a period of from about 2 to 24 hours or more and finally oxidized at a temperature of about 700° F. to about 1100° F. for a period of about 0.5 to 10 hours, and preferably about 1 to about 5 hours. This oxidation step is preferably performed in the presence of air having a minor amount of chloride present therein.

It is preferred that the resultant calcined catalytic composite be subjected to a substantially water-free reduction prior to its use in the conversion of hydrocarbons. This step is designed to insure a uniform and finely divided dispersion of the metallic component throughout the alumina carrier material. Preferably, substantially pure and dry hydrogen (i.e. less than about 20 vol. p.p.m. $H_2O$) is used as the reducing agent in this step. The reducing agent is contacted with the calcined catalyst at a temperature of about 800° F. to about 1200° F. and for a period of time of about 0.5 to about 10 hours or more effected to substantially reduce both metallic components to their elemental state. This reduction treatment may be performed in situ as part of a start-up sequence if precautions are taken to predry the plant to a substantially water-free state and if substantially water-free hydrogen is used.

Although it is not essential, the resulting deduced catalytic composite may, in many cases, be beneficially subjected to a presulfiding operation designed to incorcorparte in the catalytic composition from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more.

According to the present invention, the isomerizable hydrocarbon charge stock and hydrogen are contacted with a catalyst of the type described above in a isomerization zone at isomerization conditions. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed into an isomerization zone containing a fixed bed of the catalyst type previously chadacterized. It is, of course, understood that the isomerization zone may be one or more separate reactors with suitable means therebetween to insure that the desired isomerization temperature is maintained at the entrance to each reactor. It is also to be noted that the reactants may be contacted with the catalyst bed in eithed upward, downward, or radial flow fasion. In addition, it is to be noted that the reactants may be in the liquid phase, a mixed liquid-vapor phase, or a vapor phase when they contact the catalyst with best results obtained in the vapor phase.

The process of this invention, utilizing the catalyst hereinbefore set forth, for isomerizing isomerizable saturated hydrocarbons is preferably effected in a continuous flow, fixed bed system. One particular method is continuously passing the hydrocarbon, in admixture with hydrogen, to a reaction zone containing the catalyst and maintaining the zone at proper isomerization conditions such as a temperature in the range of about 0° to about 425° C. or more, preferably 50° C. to 425° C., a pressure of about atmospheric to about 200 atmospheres or more and a mole ratio of hydrogen to hydrocarbon of about 0.1 to 10.0 or more. The hydrocarbon is passed over the catalyst at a liquid hourly space velocity (defined as volume of liquid hydrocarbon passed per hour per volume of catalyst) of from about 0.1 to about 20 hr.$^{-1}$ or more. In addition, diluents such as argon, nitrogen, etc. may be present. The isomerized product is continuously withdrawn, separated from the reactor effluent, and recovered by conventional means, preferably fractional distillation, while the unreacted starting material may be recycled to form a portion of the feedstock. These same conditions may be utilized for the hydroisomerization of olefins but in the case of the isomerization of olefins, temperatures of about 0° C. to about 300° C., and pressures of about atmospheric to about 50 atmospheres are preferably utilized to avoid excessive hydrogenation of the olefin.

Likewise, the process of this invention for isomerizing an isomerizable alkylaromatic hydrocarbon is also preferably effected by passing the aromatic to a reaction zone containing the hereinbefore described catalyst and maintaining the zone at proper alkylaromatic isomerization conditions such as a temperature in the range of about 0° C. to about 600° C. or more, and a pressure of atmospheric to about 100 atmospheres or more. The hydrocarbon is passed, in admixture with hydrogen, at a liquid hourly hydrocarbon space velocity of about 0.1 to about 20.0 hrs.$^{-1}$ or more and a hydrogen to hydrocarbon mole ratio of about .5:1 to about 20:1. Other inert diluents such as nitrogen, argon, etc. may also be present. The isomerized product is continually withdrawn, separated from the reactor effluent by conventional means such as fractional distillation, or crystallization, and recovered.

EXAMPLE

The following examples are given to illustrate the preparation of the catalyst composite to be utilized in the process of this invention and its use in the isomerization of isomerizable hydrocarbons. However, these examples are not presented for purposes of limiting the scope of this invention but in order to further illustrate the embodiments of the present process.

EXAMPLE I

Aluminum metal, having a purity of 99.99 wt. percent is digested in hydrochloric acid to produce an aluminum hydroxyl-chloride sol having a weight ratio of Al/Cl of about 1.15 and a specific gravity of 1.3450. An aqueous solution containing 28 wt. percent HMT (i.e. hexamethylenetetramine) is made up, and 700 cc. of the HMT solution is then added to 700 cc. of the sol to form a dropping solution. About 10 grams of the hydrogen form of mordenite in the form of a fine powder is added to the resulting dropping solution and uniformly distributed therein. Another portion of the mordenite is chemically analyzed and contains 11.6 wt. percent Al$_2$O$_3$, 87.7 wt. percent SiO$_2$ and 0.2 wt. percent Na. Still another portion of the mordenite is analyzed for particle size distribution. The results show that 57.6 wt. percent of the powder is between 0 to 40 microns in size and 82.1 wt. percent of the powder is between 0 and 60 microns in size.

The dropping solution containing the dispersed mordenite is passed through a vibrating dropping head and dropped in discrete particles into a forming oil maintained at 95° C. The rate of vibration and the volumetric flow of dropping solution is set to produce finished spherical particles of about 1/16 inch in diameter. The dropped particles are aged in oil overnight (about 16 hours), separated from the oil and aged in an ammoniacal solution at 95° C. for about 3 hours. The aged spherical particles are then water washed to remove neutralization salts and dried. The particles are thereupon calcined at 600° C. for 4 hours in dry air to give a carrier material having an apparent bulk density of between 0.4 and 0.5 gm./cc.

About 350 cc. of the carrier material is placed in a steam jacketed rotating vessel and 250 cc. of an impregnation solution containing chloroplatinic acid, perrhenic acid and HCl is added thereto. The vessel is rotated until all the liquid solution is evaporated. The catalyst particles are then oxidized at a temperature of about 1025° F. to produce a finished catalyst containing, on an elemental basis, 0.55 wt. percent platinum, about 0.75 wt. percent chloride and about 0.2 wt. percent rhenium, combined with an alumina carrier material containing about 5 wt. percent of the hydrogen form of the mordenite-type crystalline aluminosilicate.

EXAMPLE II

A portion of the catalyst produced by the method of Example I is placed in a continuous flow, fixed-bed isomerization plant of conventional design. Substantially pure meta-xylene is used as the charge stock. The charge stock is commingled with about 8 moles of H$_2$ per mole of hydrocarbon, heated to about 400° C., and continuously charged at LHSV of 4.0 hr.$^{-1}$ to the reactor containing the catalyst which is maintained at about a pressure of about 300 p.s.i.g. Substantial conversion of meta-xylene to para-xylene is obtained.

EXAMPLE III

Another portion of the catalyst produced by Example I is used to isomerize ethylbenzene. The reactor is maintained at 300 p.s.i.g. and 350° C. as ethylbenzene, commingled with 8 moles of H$_2$ per mole of ethylbenzene is continuously added at a LHSV of 2. Substantial conversion of ethylbenzene to the three xylene isomers is observed.

EXAMPLE IV

Another portion of the catalyst produced by Example I is used to isomerize ortho-xylene to para-xylene. The reactor is maintained at a temperature of 400° C. and a pressure of 300 p.s.i.g. as ortho-xylene, commingled with 8 moles of H$_2$ per mole of ortho-xylene is passed to the reactor at a liquid hourly space velocity (LHSV) of 4.0 hr.$^{-1}$. Substantial conversion—i.e. approximately 90% of equilibrium conversion—of ortho-xylene to para-xylene is obtained.

EXAMPLE V

Another portion of the catalyst of Example I is used to isomerize normal butane at a pressure of 300 p.s.i.g., a temperature of 225° C., a hydrogen to hydrocarbon mole ratio of 0.5:1 and a LHSV of about 1.0 hr.$^{-1}$. Substantial isomerization of n-butane to isobutane is noted at these conditions—approximately a conversion of n-butane to isobutane of about 48 wt. percent of charge.

EXAMPLE VI

Another portion of the catalyst produced in Example I is placed in an appropriate continuous isomerization reactor maintained at a pressure of about 400 p.s.i.g. and a temperature of about 150° C. Normal hexane is continuously charged to the reactor and an analysis of the product stream shows substantial conversion to 2,2-dimethylbutane, 2,3-dimethylbutane, 2-methylpentane, and 3-methylpentane.

EXAMPLE VII

Another portion of the catalyst produced in Example I is placed in an appropriate continuous isomerization reactor maintained at a pressure of about 400 p.s.i.g. and a temperature of about 300° C. Methylcyclopentane is continuously passed to this reactor, and a substantial portion of it is converted to cyclohexane.

EXAMPLE VIII

Another portion of the catalyst produced in Example I is used to isomerize 1-butene at a pressure of about 250 p.s.i.g. and a temperature of about 110° C. in an appropriate continuous isomerization reactor. Substantial conversion to 2-butene is obtained.

EXAMPLE IX

Another portion of the catalyst prepared in Example I is charged to an appropriate continuous isomerization reactor maintained at a pressure of about 250 p.s.i.g. and a temperature of about 120° C. 3-methyl-1-butene is continuously passed to this reactor and a substantial conversion to 2-methyl-2-butene is obtained.

We claim as our invention:

1. A process for isomerizing an isomerizable hydrocarbon which comprises contacting said hydrocarbon at isomerization conditions with a catalytic composite comprising about 0.02 to about 1.0 wt. percent of a platinum group metallic component and about 0.02 to about 1.0 wt. percent of a rhenium component combined with a carrier material containing alumina and about 0.5 to about 20 wt. percent, based on said carrier material, of a finely divided crystalline aluminosilicate selected from the group consisting of faujasite, acid-extracted mordenite having a $SiO_2/Al_2O_3$ ratio greater than 11, and hydrogen form mordenite, said catalytic composite having been prepared by distributing said finely divided crystalline aluminosilicate throughout an aluminum hydroxyl chloride sol, gelling the resultant mixture to produce a hydrogel, calcining the resulting hydrogel, and impregnating the calcined hydrogel with said platinum group and rhenium components.

2. The process of claim 1 further characterized in that said platinum group component is platinum, palladium, or compounds thereof.

3. The process of claim 1 further characterized in that said catalyst contains from about 0.1% to about 1.5% fluorine or chlorine.

4. The process of claim 1 further characterized in that said catalyst contains a sulfur component.

5. The process of claim 1 further characterized in that said isomerizable hydrocarbon is a saturated hydrocarbon, said isomerization conditions include a temperature of about 50° C. to about 425° C., a pressure of about atmospheric to about 200 atmospheres and a liquid hourly space velocity of about 0.1 to about 10 hrs.$^{-1}$, said crystalline alumino-silicate being faujasite or mordenite.

6. The process of claim 5 further characterized in that said saturated hydrocarbon is a paraffin or a cycloparaffin.

7. The process of claim 6 further characterized in that said paraffin is a $C_4$-$C_7$ n-alkane.

8. The process of claim 6 further characterized in that said cycloparaffin is methylcyclopentane.

9. The process of claim 1 further characterized in that said isomerizable hydrocarbon is an olefinic hydrocarbon, said isomerization conditions include a temperature of about 0° C. to about 300° C., a pressure of about atmospheric to about 50 atmospheres and a liquid hourly space velocity of about 0.1 to about 10 hr.$^{-1}$, said crystalline aluminosilicate being a faujasite or mordenite.

10. The process of claim 1 further characterized in that said hydrocarbon is commingled with about 0.1 to about 10.0 moles of hydrogen per mole of hydrocarbon.

11. The process of claim 1 further characterized in that said isomerizable hydrocarbon is an alkylaromatic hydrocarbon, said isomerization conditions include a temperature of about 200° C. to about 600° C., a pressure of about atmospheric to about 100 atmosphers, a liquid hourly space velocity of about 0.1 to about 20.0 hrs.$^{-1}$, and a hydrogen to hydrocarbon mole ratio of about .5:1 to about 20:1, said crystalline aluminosilicate being faujasite or mordenite.

12. The process of claim 11 further characterized in that said alkylaromatic is a $C_8$ alkylaromatic or a non-equilibrium mixture of $C_8$ alkylaromatics.

13. The process of claim 12 further characterized in that said $C_8$ alkylaromatic is a xylene or a mixture of non-equilibrium xylenes.

14. The process of claim 13 further characterized in that said xylene is meta-xylene.

References Cited

UNITED STATES PATENTS 3,369,997  2/1968  Hayes et al. _____ 208—139

FOREIGN PATENTS 45,260  10/1961  Poland _____ 260—668

CURTIS R. DAVIS, Primary Examiner

U.S. Cl. X.R.

260—668, 683.2, 683.68